United States Patent
Lemofouet et al.

(10) Patent No.: US 8,567,183 B2
(45) Date of Patent: Oct. 29, 2013

(54) MULTISTAGE HYDRAULIC GAS COMPRESSION/EXPANSION SYSTEMS AND METHODS

(75) Inventors: Sylvain Lemofouet, Romanel-sur-Lausanne (CH); Alfred Rufer, Villard-sous-Yens (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 890 days.

(21) Appl. No.: 12/677,706

(22) PCT Filed: Sep. 12, 2008

(86) PCT No.: PCT/IB2008/053691
§ 371 (c)(1),
(2), (4) Date: Mar. 11, 2010

(87) PCT Pub. No.: WO2009/034548
PCT Pub. Date: Mar. 19, 2009

(65) Prior Publication Data
US 2010/0199652 A1   Aug. 12, 2010

(30) Foreign Application Priority Data
Sep. 13, 2007   (WO) .................. PCT/IB2007/053700

(51) Int. Cl.
*F04B 39/00*   (2006.01)

(52) U.S. Cl.
USPC .................................. 60/408; 60/414; 60/456

(58) Field of Classification Search
USPC .................... 60/407, 408, 414, 415, 417, 456
See application file for complete search history.

(56) References Cited

U.S. PATENT DOCUMENTS 1,886,164 A   11/1932   Christensen
1,929,350 A   10/1933   Christensen
4,651,525 A * 3/1987   Cestero .......................... 60/407
6,145,311 A   11/2000   Cyphelly

FOREIGN PATENT DOCUMENTS

| DE | 170677 | 5/1905 |
| DE | 19846481 | 5/2000 |
| WO | 2008130267 | 11/2008 |

OTHER PUBLICATIONS

Sylvain Lemofouet; "Investigation and Optimisation of Hybrid Electricity Storage Systems Based on Compressed Air and Supercapacitors"; PhD Thesis No. 3628—267 pgs, 2006.
I. Cyphelly, A. Rufer, P. Bruckmann, W. Menhardt, A. Reller; "Usage of Compressed Air Storage System" DIS project 240050, Swiss Federal Office of Energy, May 2004—14 pgs.

* cited by examiner

*Primary Examiner* — Thomas E Lazo
(74) *Attorney, Agent, or Firm* — Sturm & Fix LLP

(57) ABSTRACT

Multistage hydraulic systems and methods for converting the potential energy of a pressurized gas, particularly air, into mechanical work when operating in motor, and for producing compressed gas from the mechanical work of the rotating shaft when rotating when operating in compressor mode, by performing a successive expansion/compression of the said gas. Each of the systems comprises: a multistage Compression-Expansion Unit made of several hydraulic Compression-Expansion Modules having different capacity and integrating a gas/liquid separating heat exchanger, designed to convert pressure power into a hydraulic power and vice-versa, by performing an essentially isothermal compression/expansion of the gas; a single stage or multistage, direct or indirect, external forced-air Heat Exchanger for maintaining the active liquid at ambient temperature; and a multi-circuit, multi-displacement Hydraulic Motor/Pump for converting hydraulic power into mechanical power and vice-versa.

17 Claims, 14 Drawing Sheets

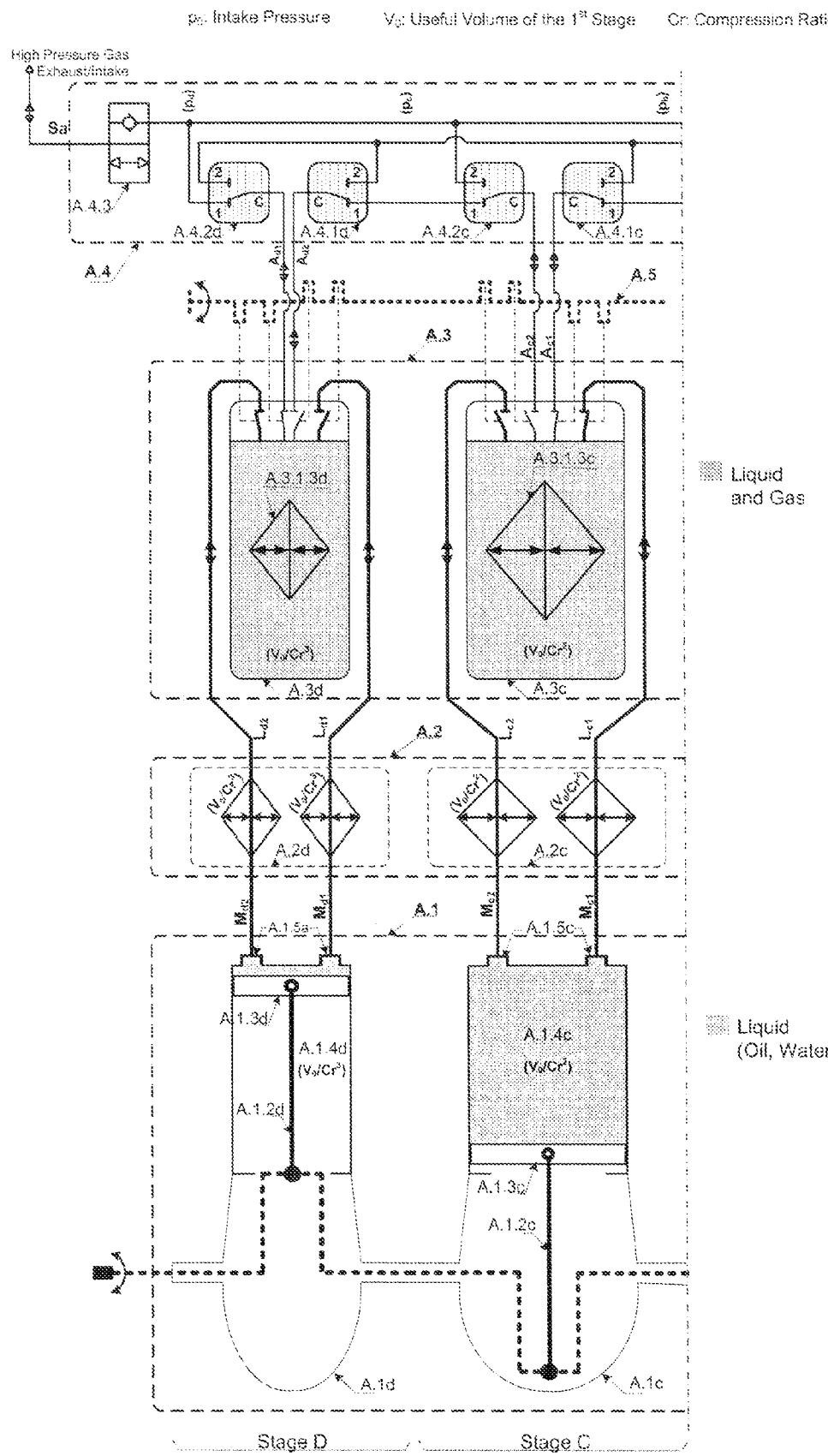
Figure 1.a

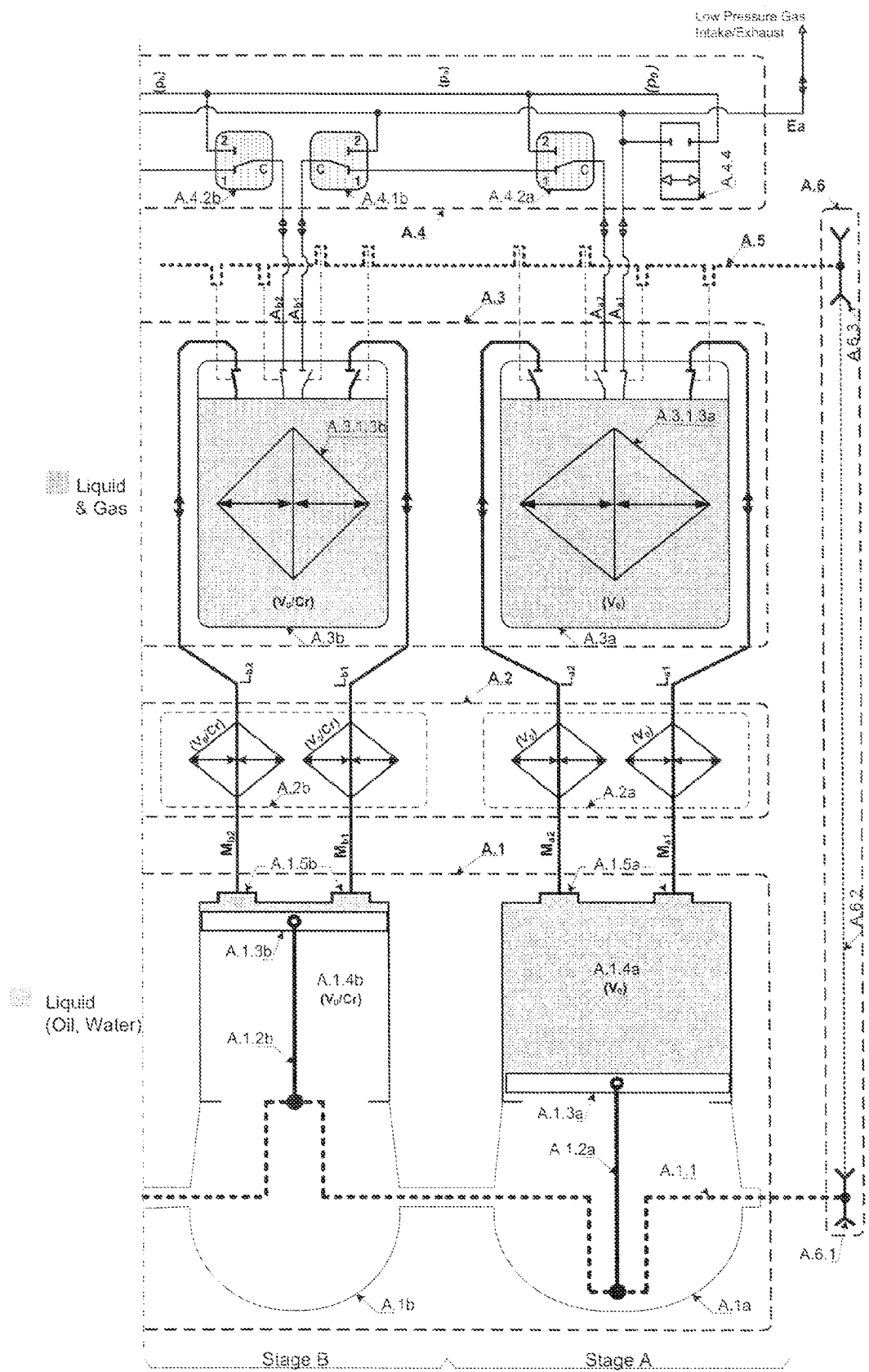
Figure 1.b a) Direct Air-Liquid Interface b) Isolated Air-Liquid Interface

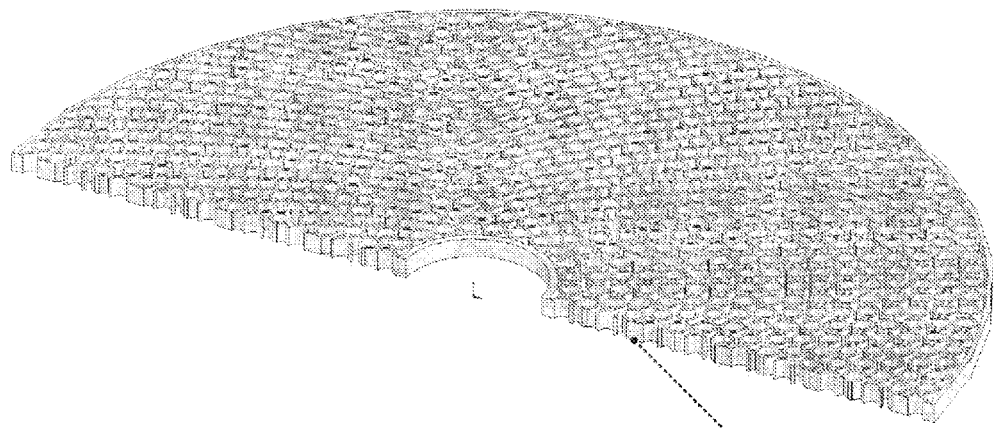
Figure 6.a
A.3.1.3.3
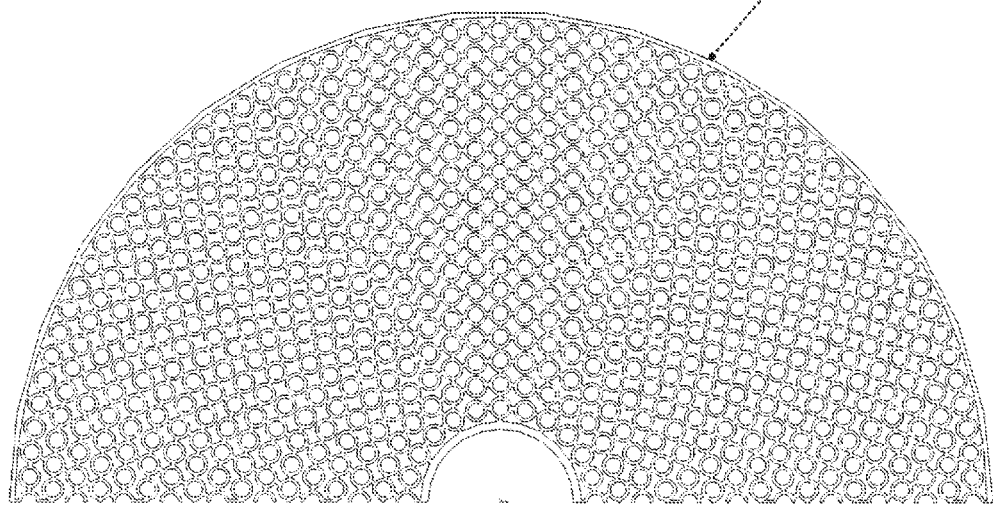
Figure 6.b

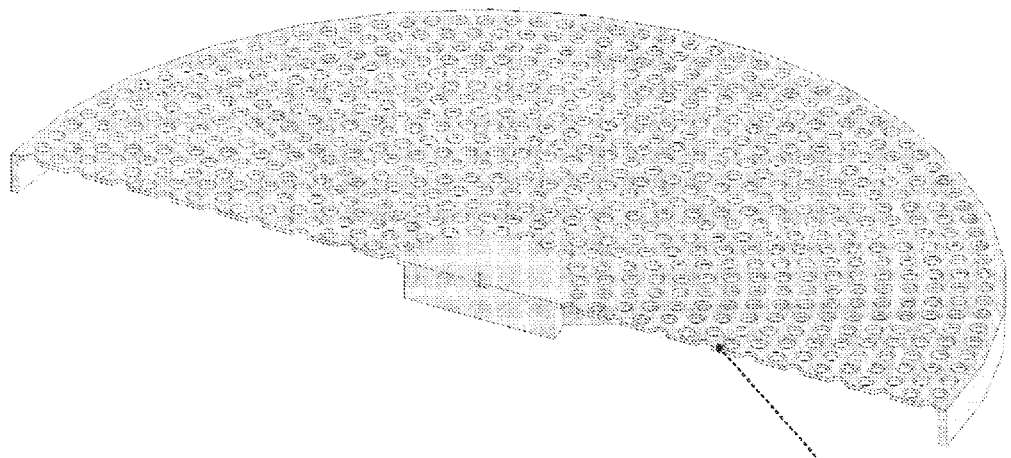
Figure 7.a
A.3.1.3.4
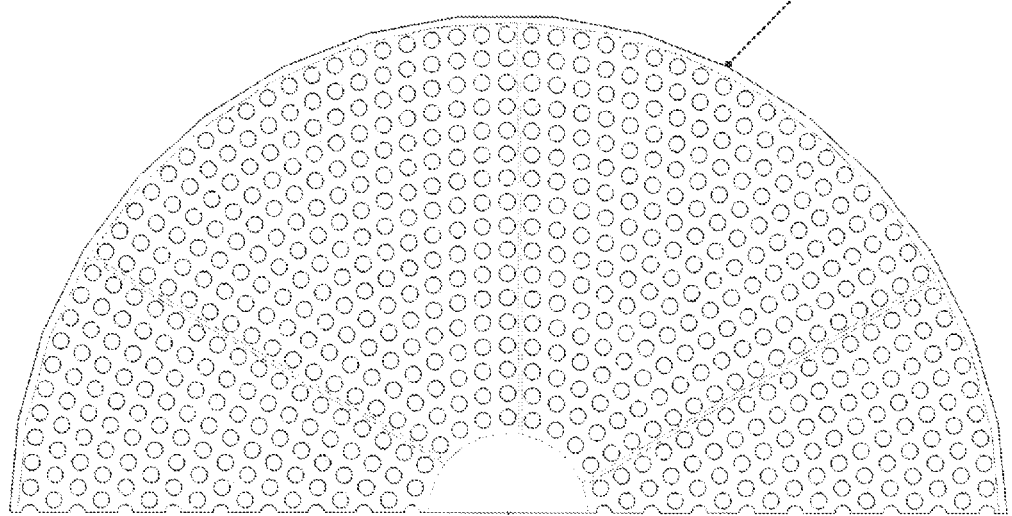
Figure 7.b

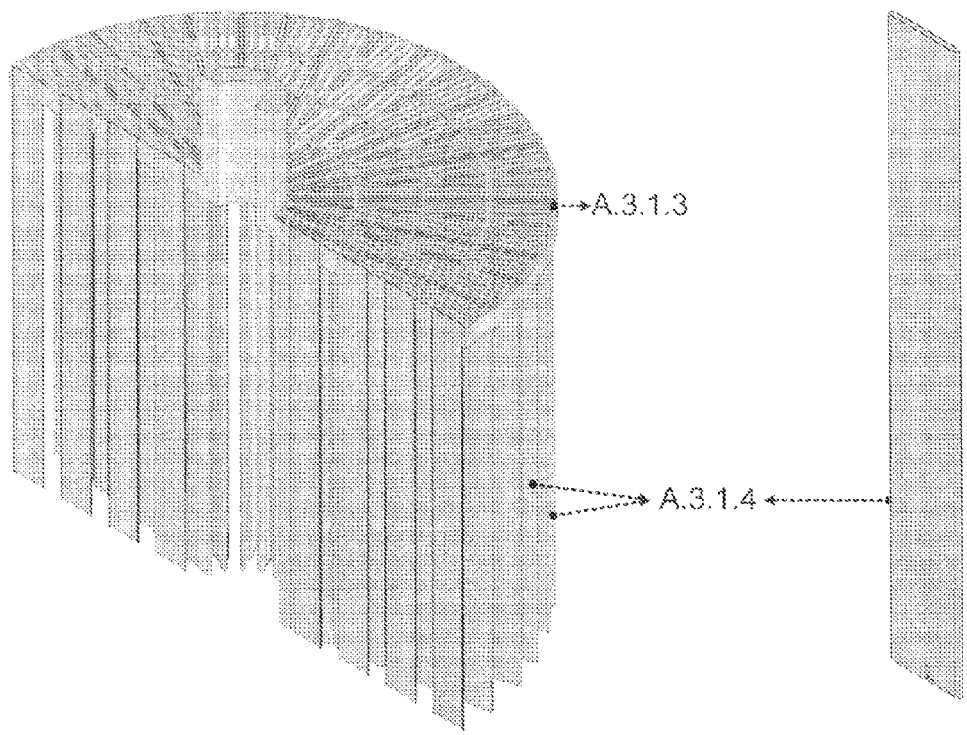
Figure 8.a
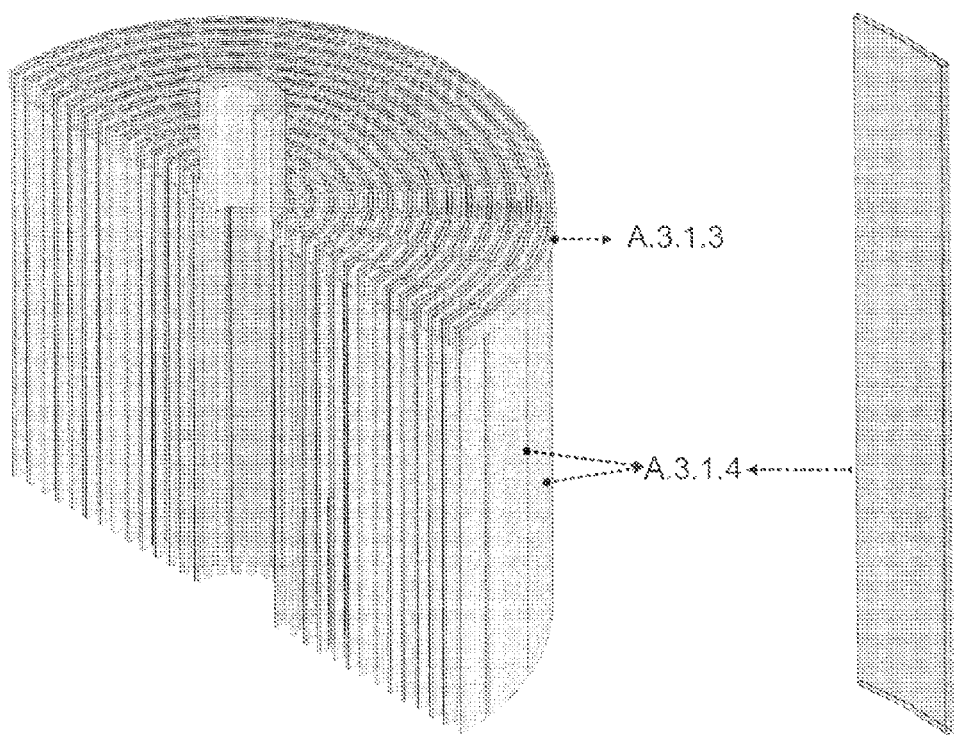
Figure 8.b

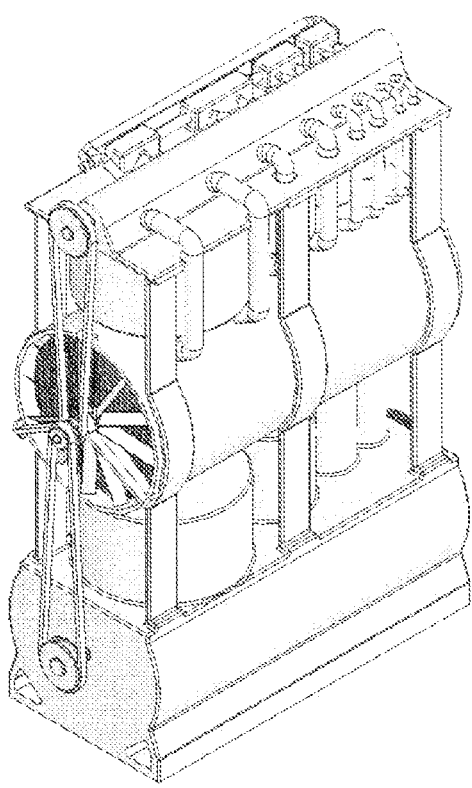
Figure 9.a
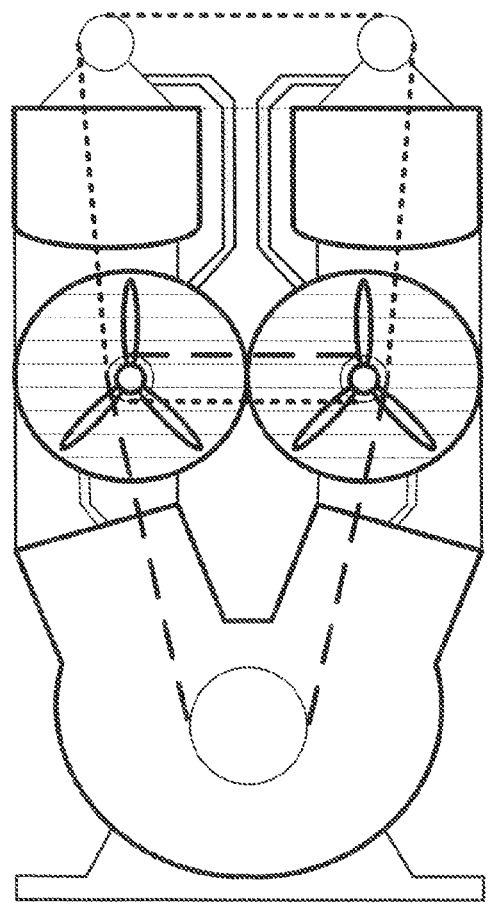
Figure 9.b

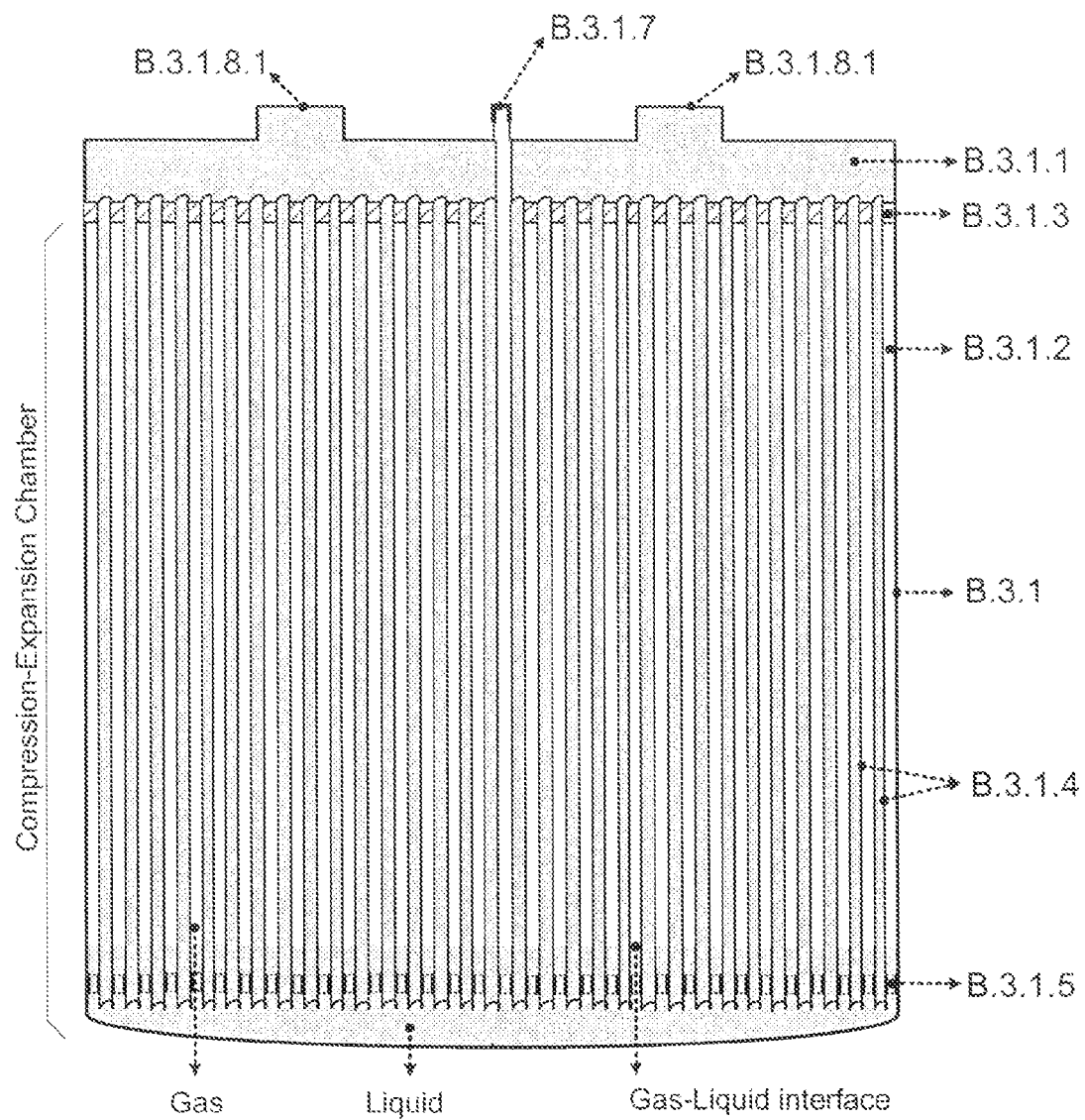
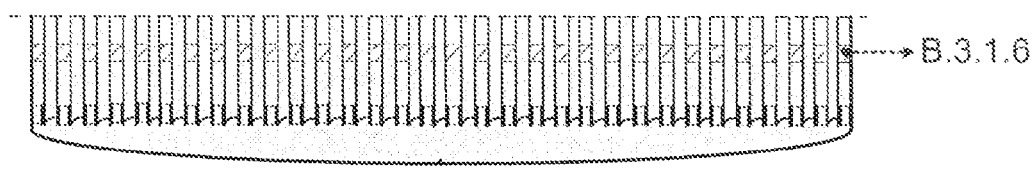
Figure 16

MULTISTAGE HYDRAULIC GAS COMPRESSION/EXPANSION SYSTEMS AND METHODS

FIELD OF THE INVENTION

This invention concerns methods of efficiently producing high pressure gas and of converting the potential energy of pressurized gas into mechanical work and vice-versa, as well as reversible, self-controlled hydraulic systems, which directly convert the pressure energy of compressed gas, particularly air, into mechanical work and vice-versa, by performing successive high efficiency compression/expansion.

BACKGROUND OF THE INVENTION

A list of the references quoted in this section is given at the end of the Description.

This invention is related to the production of high pressure air to be used for breathing purposes (medical, diving, etc) or as power source or power transmission for various air-powered tools and industrial processes. It is also related to the use of compressed air as energy storage media like in the case of compressed-air-powered cars or for example to circumvent the intermittency of some renewable energy sources such as solar and wind sources.

The potential energy of compressed air is generally exploited by firstly converting it into mechanical work. Two main categories of energy conversion systems have been proposed for that purpose: pure pneumatic conversion systems where the only active fluid is air and hydro-pneumatic conversion systems that use at least one liquid (oil, water) as active fluid.

Pneumatic Conversion Systems

Pneumatic conversion was the first (and still is the only commercially available) conversion solution used to exploit compressed air for the purpose of energy conversion. It consists, for low and medium power ranges or high compression ratios, in using mainly positive displacement (or volumetric) air machines to produce compressed air and later withdraw energy from it. In these machines, the variations of the working fluid's volume in a work-chamber produce equivalent displacements of the mechanical member, transmitting thus the energy and vice versa. The dynamic effect of the fluid is therefore of minor importance, unlike in kinetic (or turbo) machines where the kinetic energy of the working fluid is transformed into mechanical motion and vice versa. There are two main families of volumetric machines:

Rotary machines like lobe, vane, and screw machines.
   Reciprocating machines like diaphragm and piston machines. In most high power and pressure ratio ranges, the piston type is commonly used because of its higher efficiency and pressure ratio.

Since it is difficult to realise an isothermal process in these work-chambers, the compression/expansion process is subdivided into several stages and heat exchangers are inserted in between. Thus the complete cycle is more or less close to an isothermal cycle depending on the performances of the heat exchangers. This principle is as old as the first application of compressed air in propulsion in the 1800s and it is gaining nowadays more interest and improvements with the new developments in compressed-air-powered cars [1]. However, given the difficulties to implement a good heat exchange in the compression/expansion chambers, and the important leakage and friction related to the gaseous nature of air, the pressure ratings and conversion efficiency of this conversion system remain low and make it inefficient for most energy applications.

Hydro-Pneumatic Conversion

The use of hydraulic machines to circumvent the drawbacks of pure air machines has been investigated, as they suffer less from the above problems and therefore exhibit very high conversion efficiencies. One of the main challenges in using hydraulic systems to compress/expand air is the liquid-to-air interface.

A first solution has been proposed by Cyphelly & al. and is described in [2], [3] under the acronym "BOP: Batteries with Oil-hydraulics and Pneumatics". In this system air is compressed/expanded in alternating Liquid-Piston Work-chambers where a "Thin Plate Heat Exchanger" is integrated. During compression, the thin plates transfer the heat from gas top part to the liquid bottom part and the other way round during expansion. However, good heat exchange will require a high density of plate, which is not easy to realise.

Recently, another solution has been patented by Rufer & al. with as main original proposition work-chambers where the compression is performed by injecting the liquid in the form of a "shower" in the chamber, allowing a fast and effective abortion of the compression heat [4]. This solution however requires an external liquid circulating pump to reheat the air during expansion.

In both cases, there is a concern about diffusion of the air into the liquid due to the direct contact between the two fluids. In addition, these hydro-pneumatic systems are somewhat bulky as they are assemblages of several distinct components and machines. Moreover, these split topologies require many ancillary devices for the command and control of the system's operation.

U.S. Pat. No. 1,929,350 discloses an apparatus for compressing gases which has an external heat exchanger circulating external cooling liquid through tubes passing through the expansion/compression chamber.

It would be desirable to provide a hydro-pneumatic conversion system with a simple and efficient integrated heat exchanger that can effectively operate both during compression and expansion. It would be also desirable to have a more compact, flexible and scalable solution that can be easily adapted to stationary as well as mobile applications. The present invention proposes original solutions to achieve these objectives.

SUMMARY OF THE INVENTION

The invention provides a multistage hydraulic system for converting the potential energy of a pressurized gas, particularly air, into mechanical work when rotating a shaft in one direction, and for producing compressed gas from the mechanical work of the rotating shaft, when rotating the shaft in the reverse direction or in the same direction, by performing successive quasi-isothermal expansion/compression of the gas. The inventive system comprises:

A multistage hydraulic gas Compression/Expansion Unit made of several Compression/Expansion Modules each having compression/expansion chambers of different volumes. Each Module integrates an internal gas/liquid separating heat exchanger and is arranged to convert pressure power into hydraulic power of an active liquid, and vice-versa, by quasi-isothermal compression/expansion of the gas.
   An external Heat Exchanger located outside the Compression/Expansion Unit for externally circulating active liquid that has been heated/cooled in the Compression/

Expansion Unit by gas compression/expansion, and arranged to keep the externally circulating active liquid at a substantially constant temperature by heat transfer with ambient air.

A reversible, multi-circuit multi-displacement Hydraulic Motor/Pump having a common driving/driven rotatable shaft. This Hydraulic Motor/Pump is arranged to convert hydraulic power into mechanical power of the rotatable shaft, and vice-versa. The Hydraulic Motor/Pump has several circuits in correspondence with the Compression/Expansion Modules of the Compression/Expansion Unit, each circuit being of different displacement and being connected to a Compression/Expansion Module of corresponding displacement or volume.

In one embodiment, the engine according to the invention is made of several hydro-pneumatic stages mounted, on the bottom side, on a common crankshaft and connected, on the top side, in series in an air circuit to perform a highly efficient multistage compression or expansion process. Each stage consists of three main parts:

A special liquid-piston unit that converts the pressure energy into hydraulic power by performing isothermal compression-expansion processes thanks to an integrated, "Tubular Heat Exchanger", which allows the in and out-flowing active liquid to absorb/provide the compression/expansion heat. The active liquid thus plays the roles of power transmission and heat transport.

A forced-air external heat exchanger that maintains the active liquid at ambient temperature by exchanging its heat with the surroundings. The fan of this heat exchanger is directly driven by the crankshaft through a belt or chain.

A single cylinder, valve-free hydraulic motor-pump (SCMP) that converts the hydraulic power into mechanical work and vice-versa.

Several air and liquid valves operated by a common camshaft are used to control the compression/expansion and transfer of the two fluids from one enclosure to the other. Several pressure-controlled air valves are also used to operate the system in a variable stage configuration. The different parts are arranged in such a way to form a single compact embodiment and to ease the automatic control of the valve and the drive of the external heat exchanger's fan.

Further embodiments of the inventive system are set out in the claims

Other aspects of the invention are a method for converting the potential energy of pressurized gas, particularly air, into mechanical work of a rotating shaft by performing a sequence of transformations, and a complementary method for compressing a gas, particularly air, from the mechanical work of a rotating shaft by performing a sequence of transformations, as set out in further detail in the claims.

In these methods, advantageously the sequence of transformations, involving two stages of a multistage hydraulic gas expansion/compression unit, two circuits of a multi-circuit multi-displacement hydraulic motor/pump and the external heat exchanger, is repeated several times to perform a multistage expansion/compression process with equal expansion/compression ratio among stages.

These and further features of the invention will be apparent from the following specific description.

BRIEF DESCRIPTION OF THE DRAWINGS

The invention will be described by way of example with reference to the accompanying drawings, in which:

FIGS. 1a and 1b are side-by-side diagrams of an inventive multistage hydraulic gas compression/expansion system (System 1) using one "Piston-Rod-Crankshaft" system of a multistage, radial piston motor/pump for each compression/expansion stage and a multistage multi-circuit heat exchanger mounted between the multistage motor/pump and compression/expansion unit.

FIG. 6a is a cut-away perspective view of the tubes' holding plate for a tubular heat exchanger and FIG. 6b is a cut-away top view.

FIG. 7a is a cut-away perspective view of a mobile fluid separation plate for a tubular heat exchanger and FIG. 7b is a cut-away top view.

FIG. 8 illustrates other possible layouts of the internal Heat Exchanger integrated in the hydraulic gas compression/expansion module;

FIG. 9a shows in a perspective view a "Single-in-line" vertical topology of the hydraulic gas compression/expansion engine according to the invention.

FIG. 9b sketches a "V" topology of the hydraulic gas compression/expansion engine according to the invention.

FIG. 16 illustrates a possible layout of the hydraulic gas compression/expansion module with integrated internal heat exchanger for the inventive system 2, like FIG. 4 for the inventive system 1.

DETAILED DESCRIPTION OF THE INVENTION

Constitution of the First Inventive System (System 1)

The machine according to the invention is made of 6 main parts as illustrated in FIG. 1:

A special multi-circuit multi-displacement hydraulic piston motor/pump A.1.

A multistage multi-circuit heat exchanger A.2 made of several 2-circuit heat exchange stages A.2a to A.2d.

A multistage multi-capacity hydraulic gas compression/expansion unit A.3 with integrated heat exchanger.

A multistage gas directional control unit A.4 made of several directional valve for controlling the gas flow direction between the compression/expansion modules and the main system's gas intake/exhaust port Ea and Sa.

A common camshaft A.5 for controlling the gas and hydraulic valves of all the compression/expansion modules.

A mechanical transmission line A.6 for transmitting mechanical power among units if necessary.

The Multistage Hydraulic Gas Compression/Expansion Unit

Figure 4:
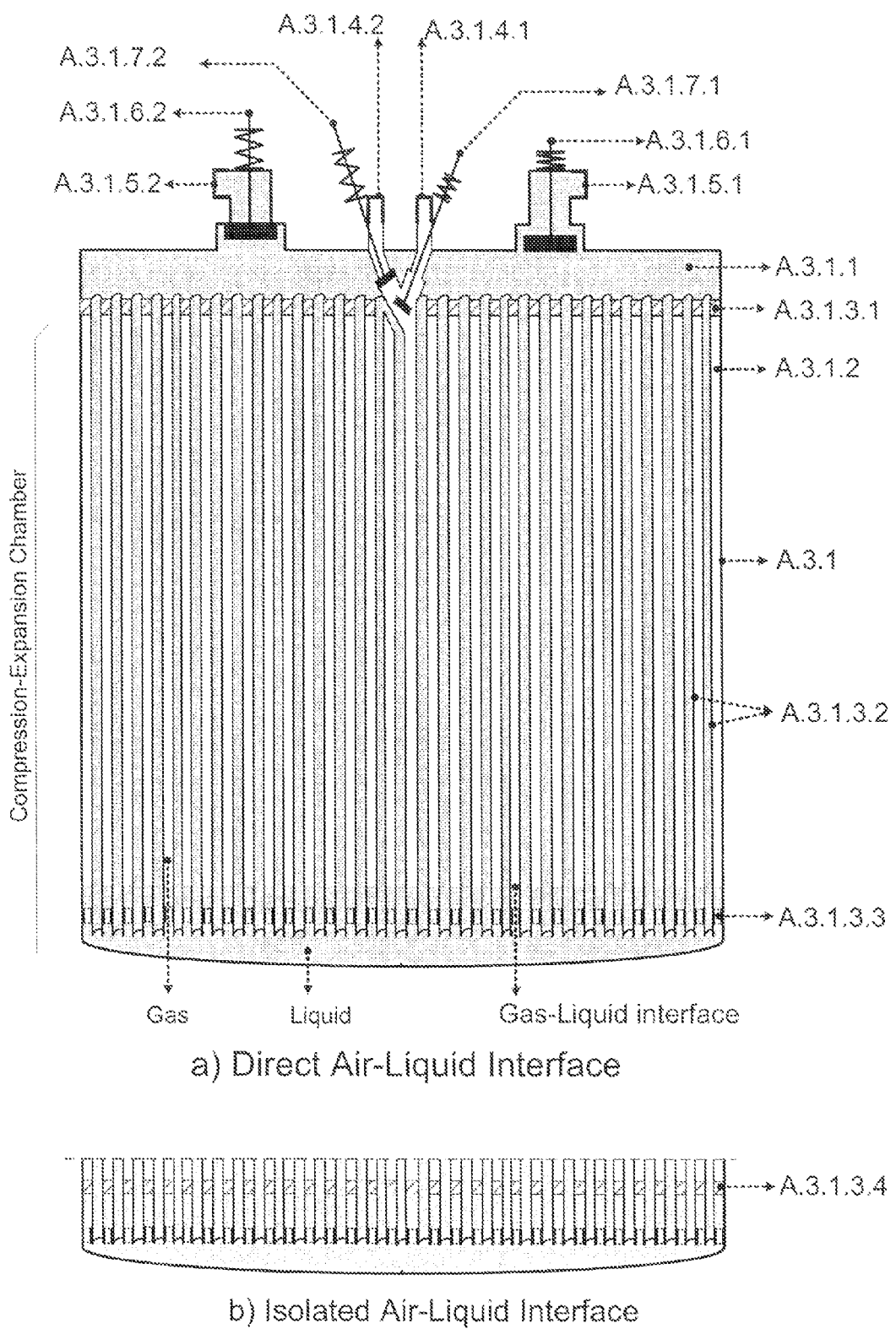
FIG. 4 illustrates a possible layout of a hydraulic gas compression/expansion module of the inventive system with an integrated internal heat exchanger.

The illustrated compression-expansion unit is designed to perform fast and almost isothermal processes. It is composed of an even number (at least 2) of hydraulic gas compression/expansion modules A.3a to A.3d of different volume and which contain a special gas/liquid heat exchanger A.3.1.3. A simplified diagram of a hydraulic gas compression/expansion module is represented in FIG. 4. It is mainly made of a vertical compression/expansion enclosure A.3.1 that integrates the special heat exchanger A.3.1.3. Its inner cavity is accessible through four valve-controlled ports: two air-ports A.3.1.4.1 and A.3.1.4.2 and, two liquid-ports A.3.1.5.1 and A.3.1.5.2. Each valve plays either the role of intake valve or that of exhaust valve depending on the operation mode (i.e. compression or expansion). The command of these valves is performed by the common camshaft A.5, which is driven by the crankshaft A.1.1 through a mechanical transmission line A.6 composed of the belt or chain A.6.2 and wheels A.6.1 and A.6.3.

The special gas/liquid Heat Exchanger A.3.1.3 is the key element to achieve the quasi-isothermal process. A possible layout of the heat exchanger is illustrated in the perspective drawing of FIG. 5. It is made of a head distribution plate A.3.1.3.1 where many heat exchange tubular hollow channels A.3.1.3.2 are fixed on their top end. These very thin tubes are uniformly distributed all over the plate's surface and held together at their bottom end by a thin porous holding plate A.3.1.3.3 that allows the flow of fluid between tubes. Such a holding plate is illustrated in the perspective drawing of FIG. 6a and the top view of FIG. 6b.

The heat exchanger is mounted so as to provide a liquid distribution chamber A.3.1.1 under the enclosure's top cap. The liquid ports are disposed and configured so as to ease a uniform distribution of liquid inside this chamber. The head distribution plate A.3.1.3.1 provides an isolating central channel through which gas manifolds run into the compression-expansion chamber.

In the ideal case, there is a direct contact between the air and the liquid in the compression-expansion chamber as illustrated in FIG. 4a. In that case, it is possible to exploit almost the entire volume of the compression-expansion chamber including the tubes' inner volume during the intake stroke. This could be achieved, for instance, by making the central tubes as long as possible to absorb all the liquid at the bottom of the chamber and thus allowing air to flow inside the tubes.

Figure 5:
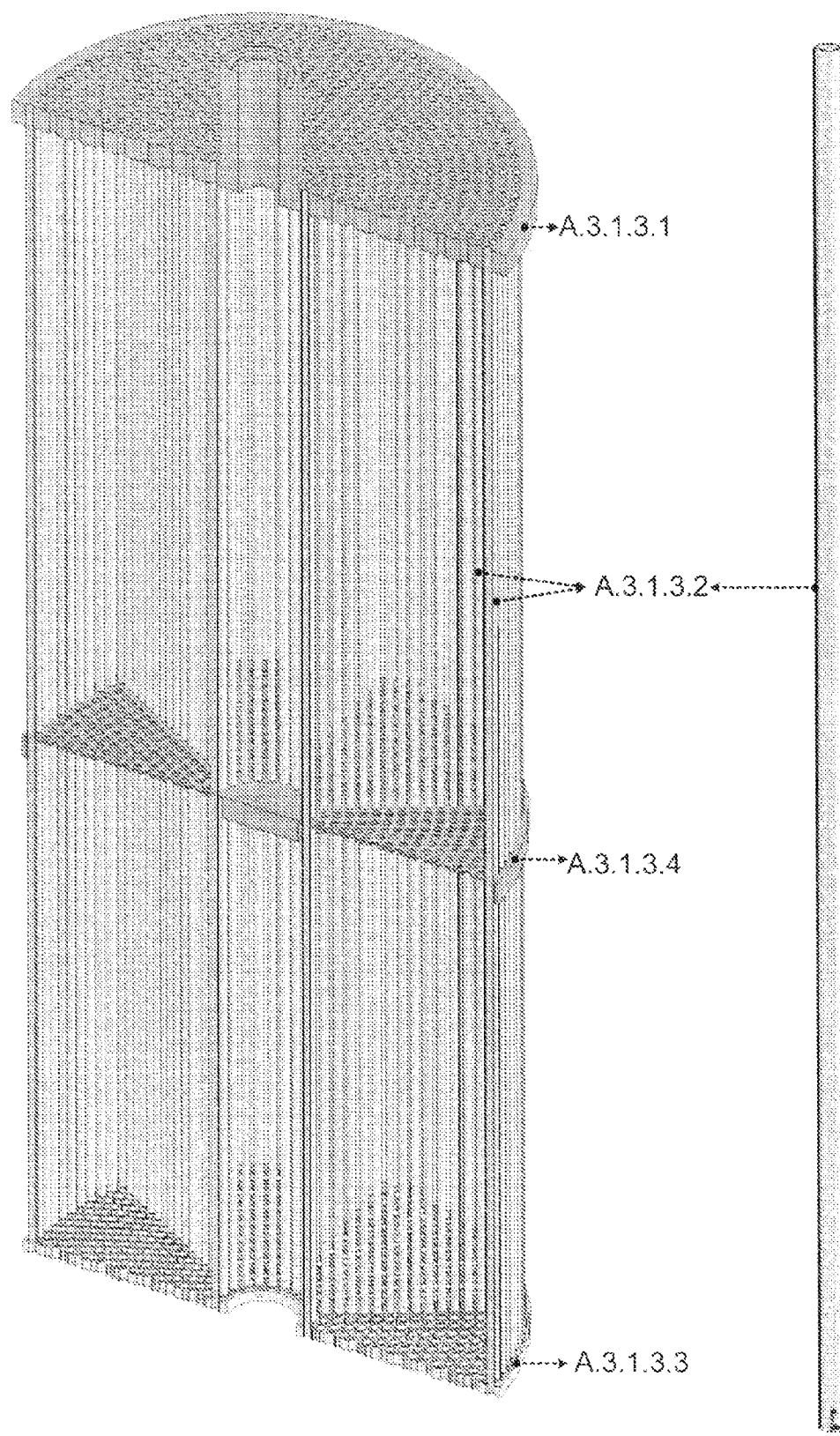
FIG. 5 is a cut-away perspective view of the layout of a Tubular Heat Exchanger integrated in the hydraulic gas compression/expansion module; for clarity, only part of the total number of tubes is represented, one tube being shown separately.

Depending on the nature of the liquid, (which is preferably water or a water emulsion) and the pressure level, more or less diffusion of gas into liquid might occur, which can cause an improper operation or premature failure of all or part of the system. To avoid this, the two fluids can be separated with a mobile separating thin plate A.3.1.3.4 as illustrated in FIG. 5. This plate is illustrated more in details on the perspective view of FIG. 9. It must be precisely manufactured and well guided to reduce friction with the tubes and the inner face of the compression-expansion chamber. With the fluid separation plate, the useful volume is limited to the space between the tubes; but in that case the compression/expansion unit can be reverse upside down so as to have the valves on the bottom side, which will shorten the hydraulic connections with the external heat exchanger.

Other possible layouts of the heat exchanger A.3.1.3 are illustrated in FIG. 8, and differ manly by the form of the hollow channels and their distribution over the head distribution plate A.3.1.3.1. In FIG. 8a, the hollow channels have an "oblong" shape and are disposed "radially" around the plate axis. In FIG. 8b, the hollow channels have a "circular" shape and are disposed "concentrically" around the plate axis. In each case, the holding plate A.3.1.3.3 and the mobile fluid separation plate A.3.1.3.4 are design accordingly.

The Multi-Circuit Multi-Displacement Hydraulic Motor/Pump

This device is a special hydraulic machine made of several single cylinder valve-free piston motor/pumps A.1a to A.1d of different displacement and mounted on a common crankshaft A.1.1. Each stage transforms the alternating in/out flow of the active liquid into the rotational motion of the crankshaft and vice-versa. It is made of a liquid cylinder A.1.4a-A.1.4d inside which a piston A.1.3a-A.1.3d translates. The translational motion of the piston is transformed into a rotational motion thanks to a classical Rod A.1.3a-A.1.3d/Crankshaft A.1.1 association. The access into the liquid cylinder is made through two uncontrolled ports A.1.5a-A.1.5d, each of which connected to a circuit of the corresponding heat exchanger's stage. When the liquid flows into the cylinder through one port, it flows out of it through the other port thanks to the control of the liquid valves A.3.1.6.1 and A.3.1.6.2, FIG. 4. Thus, the liquid always flows in closed-circuit.

The External Multistage Multi-Circuit Heat Exchanger

Figure 2:
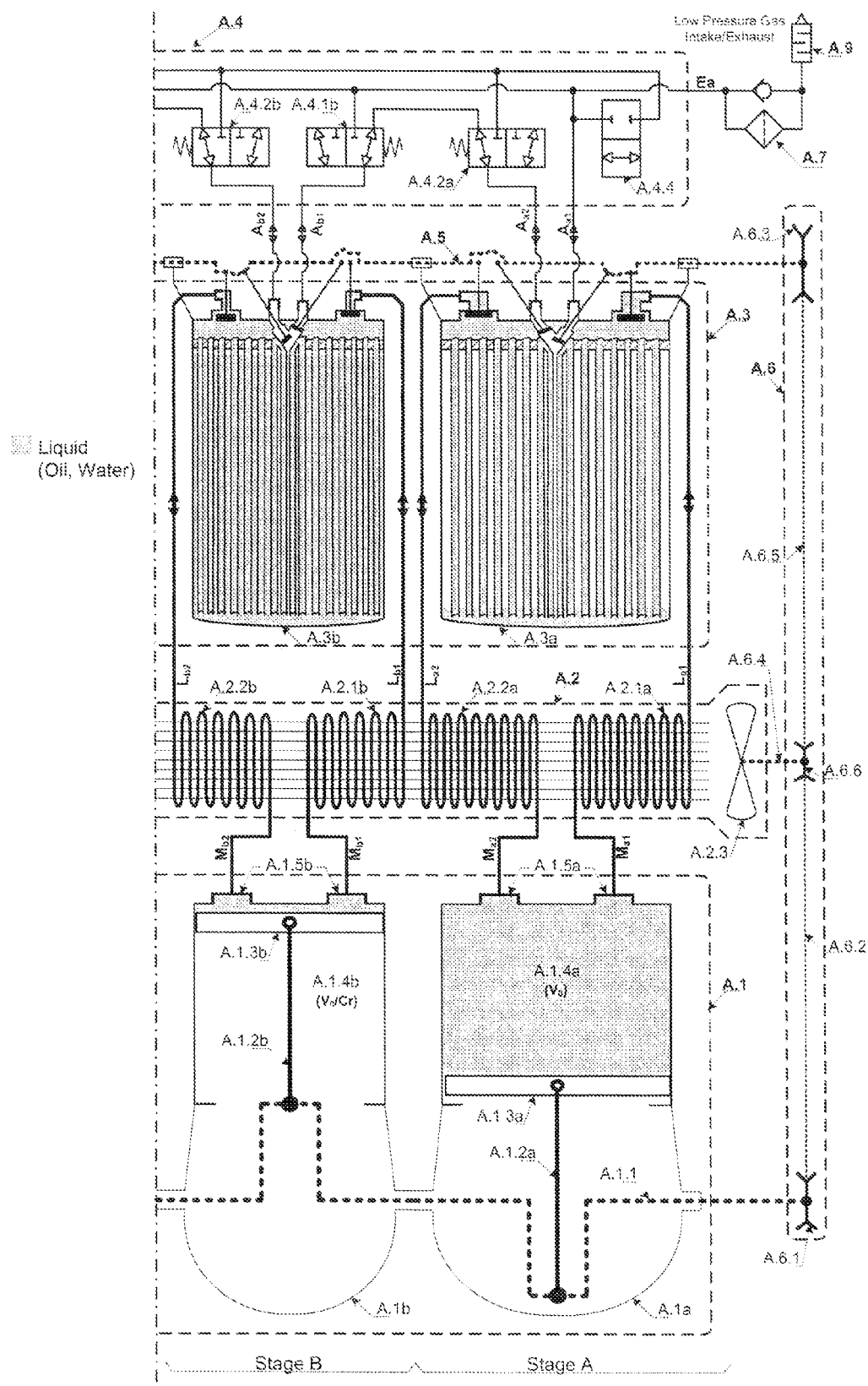
FIG. 2 illustrates in detail two stages of a variation of the inventive multistage hydraulic gas compression/expansion system with a direct "Ambient Air/Active Liquid" multistage external heat exchanger.
Figure 3:
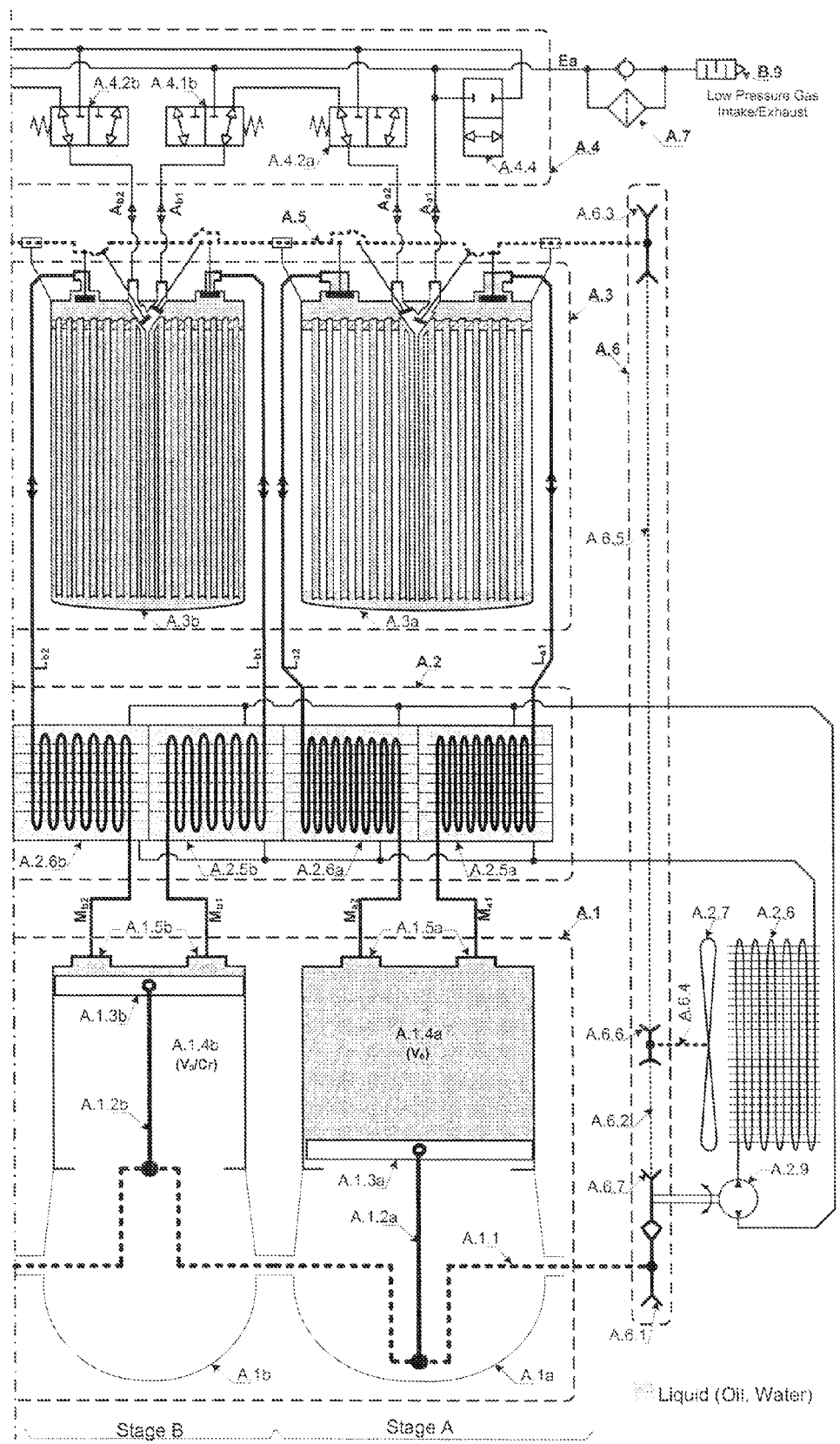
FIG. 3 illustrates in detail two stages of another variation of the inventive multistage hydraulic gas compression/expansion system with an indirect "Ambient Air/Active Liquid" multistage external heat exchanger.

The external heat exchanger A.2 is a forced-air radiator that assures a fast heat exchange between the active liquid and the ambient air. This heat exchange can be performed either directly as illustrated in FIG. 2 or indirectly as illustrated in FIG. 3. In the direct case, the heat exchanger is made up of several high-pressure hydraulic circuits (2 circuits per stage: A.2.1 and A.2.2) realised inside a kind of "honeycomb" channel where a fan A.2.3 mounted at one extremity blows the ambient air. The fan A.2.3 is driven by the crankshaft A.11 through the mechanical transmission line composed of the belt or chain A.6.2 and wheels A.6.1 and A.6.6. Each pair of circuits is connected on its bottom side to uncontrolled ports A.1.5a-A.1.5d of the corresponding stage of the hydraulic motor/pump, and on its top side to the liquid-ports of the corresponding stage of the hydraulic gas compression/expansion unit A.3a, A.3d.

An alternative configuration of the heat exchanger A.2 is proposed in FIG. 3, which reduces the difficulty to realise a high pressure compact air heat exchanger. In this configuration, the heat is first transferred from the active liquid to low pressure water thanks to an embedded Liquid/Liquid heat exchanger A.2.5-A.2.6. The low pressure water is thereafter driven by a small pump A.2.9 into a separate classical radiator A.2.8, where heat exchange with the ambient air takes place. The pump A.2.9 and the radiator's fan are driven like in the previous case, by the crankshaft A.1.1. This split configuration of the External Heat Exchanger, which is similar to that of a car's Engine, eases the mono-block design and construction of the system while allowing increasing the surface of the separated forced-air radiator and therefore the heat exchange efficacy.

Design Criteria: Volume Ratios

For each stage, as the compression/expansion processes last only half a turn of the crankshaft, the useful volume of a hydraulic gas compression/expansion module A.3a to A.3d is equal to the volume of the cylinder A.1.4a to A.1.4d of the single cylinder valve-free radial piston motor/pump of corresponding stage ($V_0$ for the stage A).

The volume of each high pressure circuit A.2.1a to A.2.1d and A.2.2a to A.2.2d of the external heat exchanger is at least equal to the volume of the cylinder A.1.4a to A.1.4d of the corresponding single cylinder valve-free radial piston motor/pump ($V_0$ for the stage A).

The volume ratio between one of the above elements and the similar one in the next consecutive stage is equal to the compression ratio Cr, in order to synchronise the operation of the stages.

Principle of Operation—General Principle

Each stage of the presented system operates as a 2-stroke engine:
- An intake stroke when the gas is entering the compression/expansion chamber A.3.2a to A.3.2d of the compression/expansion module. This stroke is passive during compressor operation mode and active during motor operation mode.
- An exhaust (or transfer) stroke when the gas is exhausting the compression/expansion chamber A.3.2a to A.3.2d of the compression/expansion module. This stroke is active during compressor operation mode and passive during motor operation mode.

Thus, the compression/expansion process is always performed simultaneously with the gas transfer, except when the transfer is performed with the high pressure air tank through the high pressure port Sa. In that case, the gas transfer from or into the module will last for only a part of the stroke time whose duration depends on the pressure level in the tank. Due to this simultaneity of the compression and transfer operations, these processes will always involve two consecutive stages of different volume (except when they are performed in relation to the outside world through the ports Sa and Ea), one performing an intake stroke and receiving the gas from the other which is performing an exhaust stroke. Thus, in a multistage operation, two consecutive stages always operate in opposite stroke. For example, in the case of a 4-stage system as illustrated in FIG. 1, the stages A and C perform an intake stroke when stages B and D perform an exhaust stroke and vice-versa, depending on the rotational direction.

The number of stages depends on the desired pressure level. For a given desired pressure, the higher this number is, the lower the stage's compression ratio will be and the higher the thermodynamic efficiency will be also. An even number of stages will ensure a more constant mechanical torque over one complete turn of the crankshaft, as the number of active stages will be equal during the two strokes.

The liquid in each stage plays two important roles:
- It is the Power Transmission Link between each compression-expansion module and the corresponding stage of the hydraulic machine.
- It is also the Heat Carrier Medium between the same compression-expansion chamber and the ambient air through the external heat exchanger.

Because of the difference in capacity among stages, the required volume of active liquid isn't the same for all the stages. To avoid unbalanced mechanical constraints on the crankshaft, the forces applied on all the pistons, which are the product of each chamber's pressure and the corresponding piston's surface, must be equal for all the stages. In case of equal compression ratios Cr for all the stages, the following relation can be written:

$$Cr = \frac{p_a}{p_0} = \frac{p_b}{p_a} = \frac{p_c}{p_b} = \frac{p_d}{p_c} = \ldots = \frac{p_x}{p_{x-1}} \quad (I)$$

Where ($p_o$) is the pressure at the port Ea and ($p_a$ to $p_d$) the pressure at the exit of each stage as indicated in FIG. 1. If isothermal compression processes are assumed as targeted, then relation (I) can be written:

$$Cr = \frac{V_0}{V_a} = \frac{V_a}{V_b} = \frac{V_b}{V_c} = \frac{V_c}{V_d} = \ldots = \frac{V_{x-1}}{V_x} \quad (II)$$

where $V_x$ is the volume of the liquid cylinders A.1.4a-A.1.4d of the hydraulic machine 8A.1. As the pistons would have the same displacement; therefore the volume ratios in (II) can be replaced by the following radius ratio:

$$Cr = \frac{R_o^2}{R_a^2} = \frac{R_a^2}{R_b^2} = \frac{R_b^2}{R_c^2} = \frac{R_c^2}{R_d^2} = \ldots = \frac{R_{x-1}^2}{R_x^2} \quad (III)$$

The cylinder diameter of a given stage (x) of the hydraulic machine is thus related to that of the consecutive lower pressure cylinder (x−1) as follows:

$$D_x = \frac{D_{x-1}}{\sqrt{CR}} \quad (IV)$$

It should be noted that this relation is not mandatory for the compression-expansion modules as they can be made in different lengths and even shapes. However, the useful volume of their compression-expansion chamber should fulfil relation (II).

The mechanical force $F_b$ applied to piston A.1.3b is given by:

$$F_b = p_b S_b \quad (V)$$

where $S_b$ denotes the surface of piston A.1.3b. Similarly, the mechanical force $F_d$ applied to the piston A.1.3d which operates synchronously with piston A.1.3b is:

$$F_d = p_d \cdot S_d = CR^2 p_b \cdot \frac{S_b}{CR^2} = p_b \cdot S_b = F_b \quad (VI)$$

Where $S_d$ denotes the surface of piston A.1.3d. This relation shows that in case of equal compression ratio for all the stages, the crankshaft A.1.1 is subject to balanced mechanical efforts even if the pistons' diameters are different.

Compressor Operation Mode

The compressor operation is described on the basis of the schematic diagrams of FIGS. 1, 2 and 4. The 3-way-2-position distribution valves A.4.1b to A.4.1d and A.4.2a to A.2.2c are kept in the position illustrated on those Figures. The compression process consists in a series of intake-exhaust/compression cycles over the sequential stages, from the atmospheric pressure ($p_o$) to the maximum admissible pressure ($p_d$) allowed in the storage tank.

Each cycle lasts one turn of the crankshaft A.1.1. As stated above, two consecutive stages always operate in opposite phases and the compression and transfer processes are performed simultaneously; in fact compression process simply consists in transferring of the gas from one module into the next module of smaller volume. Thus the gas-exhaust and liquid-intake valves of a given stage are operated in phase with the gas-intake and liquid-exhaust valves of the next stage of smaller volume.

The initial point is defined as that where the piston A.1.3a of the stage A is at the top dead centre (TDC) and is starting an intake stroke by moving downward. The gas-intake valve A.3.1.7.1a and the liquid-exhaust valve A.3.1.6.1a of the compression/expansion module A.3a are opened simultaneously by the cams of the camshaft A.5. At the same time, pistons A.1.3b and A.1.3d of stages B and D are at the bottom dead centre, ready to start a compression stroke. The gas-exhaust valves A.3.1.7.2b and A.3.1.7.2d and the liquid-intake valves A.3.1.6.2b and A.3.1.6.2d are therefore opened. Stage C is in the same state as stage A; the gas-intake valve A.3.1.7.1c and the liquid-exhaust valve A.3.1.6.1c are opened and the chamber A.3.1.2c of the module A.3c is connected with the chamber A.3.1.2b of the module A.3b.

As piston A.1.3a moves downward, fresh gas is admitted into the compression-expansion chamber A.3.1.2a through silencer A.9 and filter A.7. At the same time, the liquid which was heated during the previous compression cycle is taken out of the enclosure and transferred into the external heat exchanger's circuit A.2.1a, in place of the liquid which had been cooling there during that previous cycle and which is now transferred into the liquid cylinder A.1.4a. Simultaneously to the descent of piston A.1.3a, piston A.1.3b rises and expels its liquid contents into the heat exchanger's circuit A.2.2b, where it replaces an equal amount of cooled liquid which is in turn injected into the chamber A.3.1.2b to compress the enclosed gas by transferring it into the smaller chamber A.3.1.2c of stage C. The gas being transferred into chamber A.3.1.2c causes its liquid contents to flow out through the liquid exhaust valve A.3.1.6.2c. This out-flowing liquid enters the heat exchanger's circuit A.2.1c and transfers its contents into the cylinder A.1.4c where piston A.1.3c is being driven downward. As stage D operates in phase with stage B; piston A.1.3d moves upward and injects the liquid contents of the heat exchanger's circuit A.2.2d into the compression chamber of module A.3d, to compress its gas contents. As the air exhaust valve A.3.1.7.2d is open, when the pressure inside the chamber A.3.1.2d is slightly higher than that inside the high pressure gas tank (not represented, connected to port Sa), the check valve A.4.3 opens and the compressed air is transferred into the tank.

During the transfer stroke, the cool compressing liquid that flows downward the hollow tubes (or channels) of the integrated heat exchanger A.3.1.3 into the Compression/Expansion chamber is firstly in contact (through the very thin wall of these tubes or channels) with the gas which is being heated by the compression and pushed upward. These counter flows of the two fluids allow the liquid to quickly absorb the compression heat and thus maintain the gas at almost constant temperature. The liquid is further cooled down in the external heat exchanger. This is the key for high efficiency.

The intake stroke of stages A and C is ended when their respective pistons reach the bottom dead centre, as shown in FIG. 1. At the same time pistons of stages B and D reach the top dead centre to end their compression/transfer. The phases are now inverted, i.e. stages A and C start a compression/transfer stroke while stages B and D will start an intake stroke. All the valves previously opened are closed and those previously closed are opened. As pistons A.1.3a and A.1.3c translate upward, the gas contents of modules A.3a and A.3c are compressed and transferred into modules A.3b and A.3d respectively, while pistons A.1.3b and A.1.3d descend. When pistons A.1.3a and A.1.3c reach their top dead centres, the strokes are ended, the system is back to the initial position and a new cycle can start.

Motor Operation Mode

The system operates in motor mode in a similar way to the compressor mode, but with opposite air-flow and rotational directions. The motor operation process consists in a series of intake/expansion-exhaust cycles over the sequential stages, from the tank pressure ($p_d$) to the atmospheric (or main intake Ea) pressure ($p_o$). In this mode, the valve A.4.3 is forced to the "open" position for a while through its command (not represented) to allow the gas to flow out of the tank.

Each cycle lasts one turn of the crankshaft A.1.1 and two consecutive stages operate in oppose phases as well. The expansion processes consists in transferring the gas from the chamber of one stage to that of the next stage of bigger volume; thus the gas-exhaust and liquid-intake valves of a given compression/expansion module are operated in phase with the gas-intake and liquid-exhaust valves of the following module of bigger capacity.

During the intake/expansion stroke, the heat exchange process is performed in a similar way as for compression; the hot out flowing liquid reheats the inflowing and expanding gas through thin wall of the heat exchanger's tubes, so as to maintain it at almost constant temperature. The liquid will be further reheated in the external heat exchanger. This is the key for high expansion efficiency.

Variable Configuration of Stages

The multistage architecture allows reaching high pressure levels with high efficiency; however the operation is optimal only if all the stages are used at their optimal compression ratio; however this is often not the case because the tank pressure will vary both during compressor and motor operations. In the case of an equal compression ratio Cr for all the stages, the sequential use of "n" stages, during compression as well as expansion, will be efficient only if the tank pressure "$p_d$" is greater than "$Cr^{(n-1)}p_o$". Otherwise, the "$n^{th}$" stage will simply serve as a transfer stage and the gas will expand when entering the tank.

It can be therefore interesting to adapt the number of stages in series to the tank pressure.

This is the role of the multistage gas directional control unit A.4 which is mainly made of several 3-way-2-position distribution valves A.4.1b to A.4.1d and A.4.2a to A.4.2d. By appropriately controlling these valves in function of the pressure level in the tank, it is possible to configure the system in a "variable configuration of stages" i.e adapting the number of compression/expansion modules operating in series between the main ports Ea and Sa to the pressure level in the tank and thus optimizing the operation of the system. For a 4-stage system as illustrated in FIG. 1, the following configurations are possible:

- 4-channel 1-stage when the tank pressure is below the level "$Cr.p_0$": All the valves A.4.1b to A.4.1d and A.4.2a to A.4.2c are placed in "Position 2" and the valve A.4.2d is left as illustrated in FIG. 1; therefore all the modules are connected in parallel on the air circuit, which results in a higher air flow rate.
- 2-channel 2-stage when the tank pressure is between the level "$Cr.p_0$" and the level "$Cr^2.p_0$": The valves A.4.1c and A.4.2b are placed in "Position 2" and the others are left as illustrated in FIG. 1. Modules A.3a and A.3b are connected in series as well as modules A.3c and A.3d and the 2 pairs of modules are connected in parallel on the air circuit to form a "2-channel 2-stage" configuration.

1-channel 3-stage when the tank pressure is between the level "$Cr^2.p_0$" and the level "$Cr^3.p_0$": In this case module A.3d is deactivated by placing the valves A.4.1d and A.4.2b in "Position 2" which will connect the two gas ports to the intake line. Valve (A.4.2c) is also switched to "Position 2" and the others are left as illustrated in FIG. 1. As mentioned before, such an odd number of stages might produce irregular torque on the crankshaft as there will be two active stages A and C during half a turn and only one stage B during the other half turn. Using a 4-stage configuration within this pressure range won't solve the problem because module A.3d will simply serve as a transfer stage as explained before. The 2-stage configuration might be preferred up to the pressure level "$Cr^3.p_0$".

1-channel 4-stage when the tank pressure is greater than "$Cr^3.p_0$". All the valves are left as illustrated in FIG. 1, thus all the modules as connected in series on the gas circuit to form a 1-channel 4-stage configuration. This is the normal configuration of the machine, suited for high pressure operation.

The variable configuration allows an optimal utilization of the entire contents of the compressed air tank, or an optimal filling of an empty tank. But in practice, for a given application there is a minimum pressure under which the produced power becomes useless.

Idle (freewheeling) state: The multistage gas directional control unit A.4 also allows running the system in idle or standby state where no gas compression/expansion is performed. This is achieved by placing all the valves A.4.1b to A.4.1d and A.4.2a to A.4.2d in "Position 2" and by placing the valve A.4.4 in the "open position". Thus, all the gas-intake/exhaust valves of the compression expansion modules are connected to the low pressure intake/exhaust port Ea and no compression/expansion can be realised.

Main Advantages

The proposed machine provides many technological improvements compared to the state-of-the art Pneumatic-to-Mechanical energy conversion systems; a few of them are listed below:

Simple and efficient heat exchanger integrated in the compression/expression chamber. This is achieved thanks to its special design using very thin hollow channels that allow:

A better isolation of the air and active liquid, which restricts the risk of diffusion only on the horizontal separation surface in case of a non-isolated interface.

A single way for the inflow and outflow of the liquid inside the compression/expansion chamber, which avoids the use of an external recycling pump during expansion as proposed by Rufer & al. in PCT/IB 2007/051736, and provides a permanent heat exchange between the two fluids.

A higher heat capacity related to these metallic hollow channels that improves the quality of heat exchange.

Simple and compact power conversion topology embedded in a single embodiment. The simplest topology for the multistage engine is the vertical, in-line configuration as illustrated in perspective in FIG. 9a. Such a topology is simply scalable and the overall size of the engine will depend on its power range. A "V" configuration like in some Internal Combustion Engines (ICE) can be also envisaged as illustrated FIG. 9b. This configuration will improve the power density of the system and make it suited for mobile applications.

Simple and automatic control of the valves. Part of the mechanical energy provided to or produced by the crankshaft is used to synchronously operate the air and liquid valves like in ICE. This possibility drastically reduces the number of the needed ancillary devices such as electro-valves, and provides the system with more autonomy.

Main Limitations

The efficiency of the machine according to the invention strongly depends on the quality of heat transfer between the air and the liquid during the compression/expansion process inside the compression/expansion chamber. Given the thermal time constant of various elements involved, a high quality heat transfer will require at least a certain minimum amount of time.

In the presented configuration, the compression/expansion process would last only for a half-turn of the crankshaft. For a rotational speed of 3000 rpm for example, this process will last only for 10 ms, which might be quite short depending on the design of the Tubular Heat Exchanger. As a consequence, the optimal speeds of the presented machine lie in the lower speed range, which might not fit with the optimal speed range of some electrical machines or applications.

This limitation can be circumvented by using a speed adaptor, such as a mechanical gear box with high speed ratio, but the gearbox will increase the mass and volume of the system. A better solution that allows solving this problem is provided by the second inventive system (System 2) presented in the following paragraphs.

Constitution of the Second Inventive System (System 2)

Figure 10:
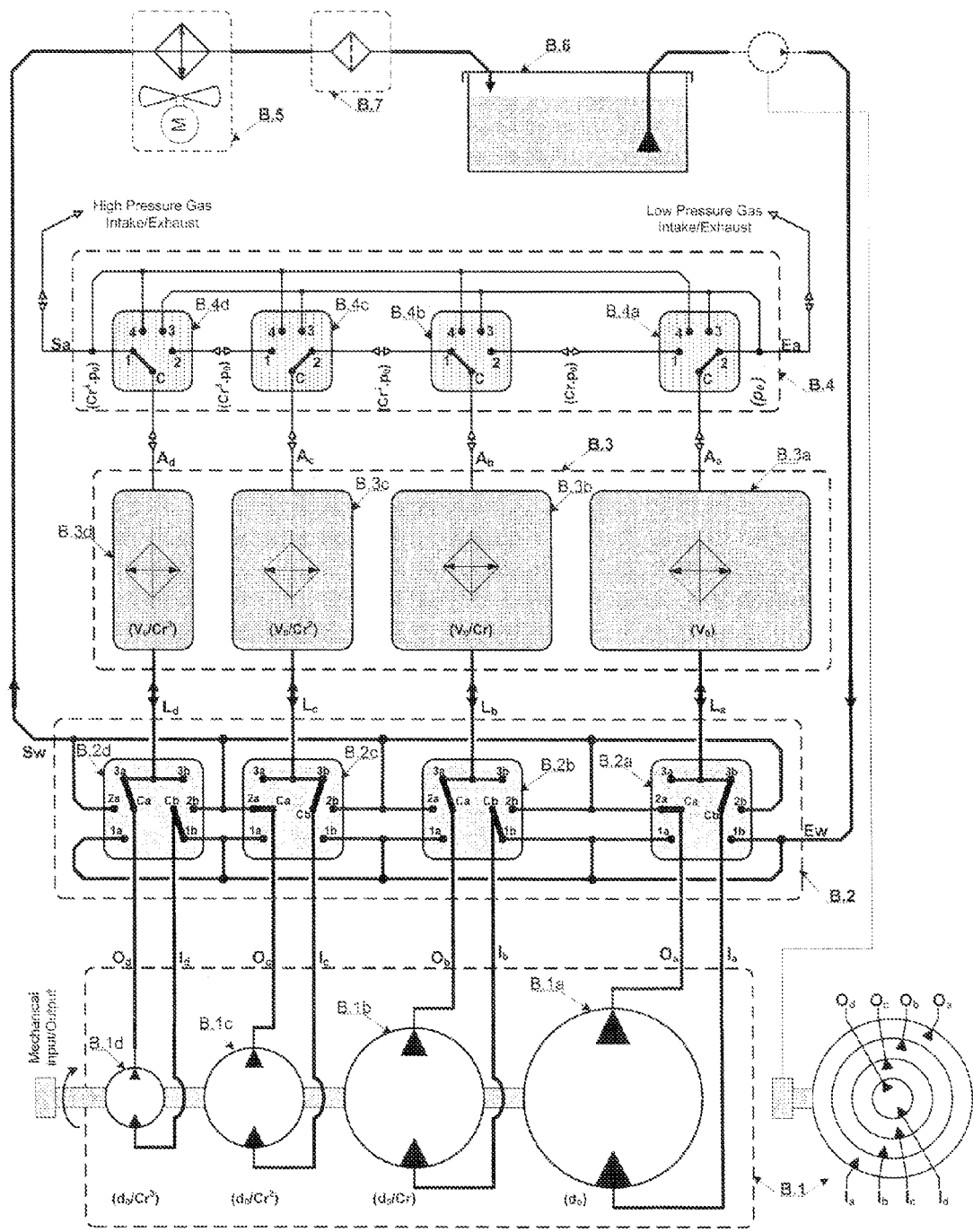
FIG. 10 is a diagram of another inventive multistage hydraulic gas compression/expansion system (System 2) using a different type of multistage multi-displacement motor/pump and a common low pressure heat exchanger and liquid reservoir for all the stages.

The second system according to the invention is made of six main parts as illustrated in FIG. 10. In the Figure "p" stands for pressure; "d" for Displacement; "V" the useful Volume and "Cr" the Compression Ratio. As shown, the second system comprises:

A multistage hydraulic gas compression/expansion unit B.3 with integrated heat exchangers for converting pneumatic power into hydraulic power and vice-versa.

A dedicated multi-circuit multi-displacement hydraulic motor/pump B.1 for converting hydraulic power into mechanical power of a rotating shaft and vice-versa.

A multi-circuit liquid directional control unit B.2 for controlling the flow direction of the active liquid.

A multistage gas directional control unit B.4 for controlling the gas flow direction and the configuring of the compression/expansion modules.

A low pressure forced-air external heat exchanger B.5 for maintaining the active liquid at ambient temperature.

A liquid reservoir B.6 for storing and supplying the active liquid which is preferably water or a water emulsion.

A liquid filter B.7.

Figure 11:
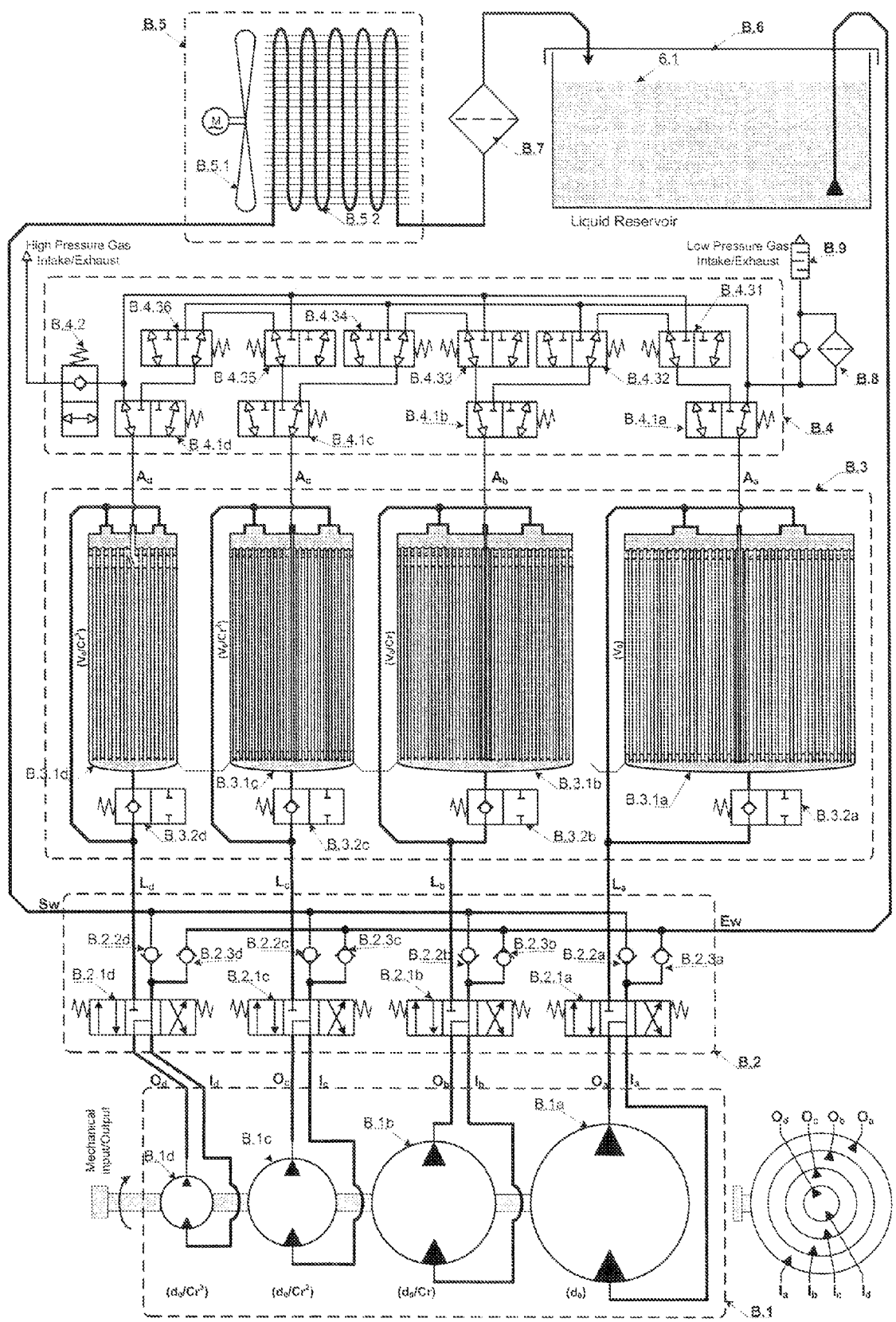
FIG. 11 illustrates in detail a variation of the second inventive multistage hydraulic gas compression/expansion system (System 2).

A detailed schematic representation of the inventive System 2 is provided in FIG. 11 that provides a variation in the design of the aforementioned main parts.

The Multistage Hydraulic Gas Compression/Expansion Unit

The compression-expansion unit is almost identical to that of System 1 except that the liquid and gas ports of the compression/expansion modules B.3.1a to B.3.1d are uncontrolled as the control of the liquid and gas flow is performed in external directional control units B.2 and B.4 respectively. Valve-controlled gas ports can be however integrated in these modules and either operated mechanically like in system 1 or electromechanically. An optional liquid port is provided at the bottom of compression/expansion modules, controlled by valves B.3.2a to B.3.2d and which will allow emptying the compression/expansion chambers more easily from the bottom.

The Multi-Circuit Multi-Displacement Hydraulic Motor/Pump

Figure 15:
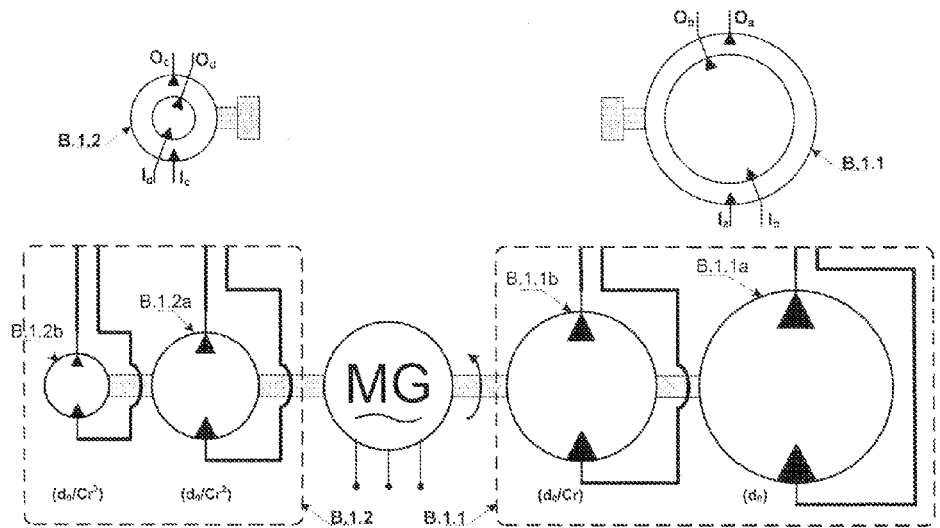
FIG. 15 illustrates a split configuration of the multistage multi-displacement hydraulic motor/pump of the inventive system 2 using a 2-end shaft electrical machine.

This device is a special hydraulic machine made of several motor/pumps B.1a to B.1d of different displacement but same power, mounted on a common shaft. Each stage transforms the alternating in/out flow of the active liquid into the rotational motion of the shaft and vice-versa. These stages operate indifferently in motor or in pump mode while rotating in the same direction; therefore they should be able to handle the same pressure on both the intake and the exhaust ports. In addition they should have a "crossing over" shaft that allows the multi-circuit assembling. Some technologies of hydraulic machine like the axial piston technology allow such a design. An association of different types is also possible. FIG. 15 illustrates a split configuration where two 2-circuit machines are used in association with an electrical machine having a 2-end shaft, which provides many advantages: A 2-circuit machine would be easier to build than a 4-circuit one. In addition, this configuration allows optimising the choice of a technology suited for "low pressure/high flow rate" for the low pressure side B.11 and a technology suited for "high pressure/low flow rate" for the high pressure side B.12.

The Multi-Circuit Liquid Directional Control Unit

The multi-circuit liquid-directional control unit B.2 is made of several directional control modules for controlling the direction of liquid flow. Each module allows each port of the motor/pump to be connected either to the corresponding compression/expansion module, or to the main liquid intake port Ew or again to the main liquid exhaust port Sw.

Figure 14:
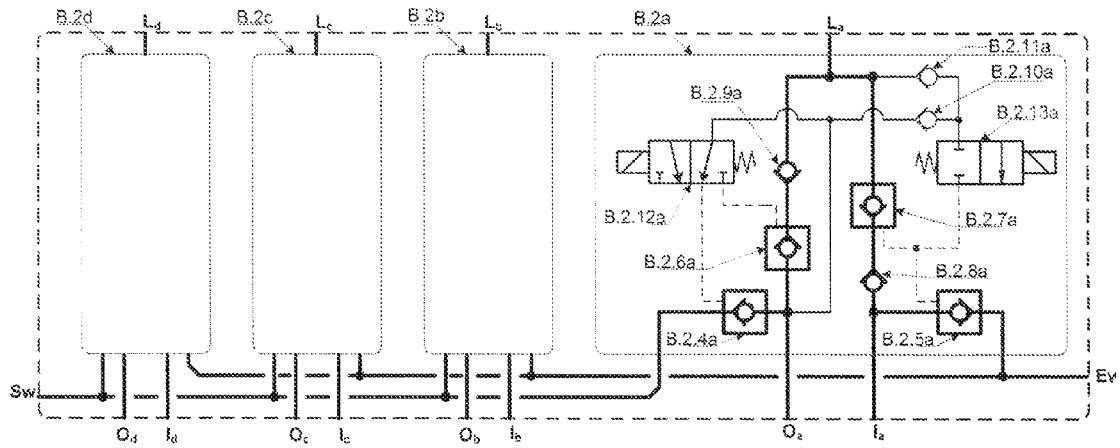
FIG. 14 illustrates a variation of the multistage liquid-directional control unit of the inventive system 2.

A variation of the liquid-directional control unit is provided in FIG. 11 where each module comprises a 4-way 3-position directional valve and two check valves. Another variation of the liquid directional control module is represented in FIG. 14 which uses mainly several pilot operated check valves. Other more or less complex designs of the liquid-directional control unit which allow realizing the same function are possible.

The Multistage Gas Directional Control Unit

The multistage gas-directional control unit B.4 is made of several directional valve for controlling the gas flow direction. Each stage allows the air port of the corresponding compression/expansion module to be connected either to the next modules (on the left or in the right) or to the main low pressure gas port Ea or again to the main exhaust port Sa.

Figure 12:
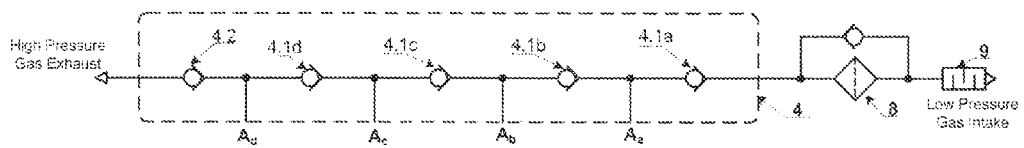
FIG. 12 illustrates a variation of the multistage gas-directional control unit of the inventive system 2 for compression operation mode only.
Figure 13:
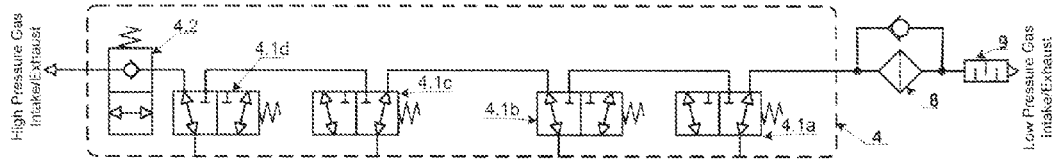
FIG. 13 illustrates a variation of the multistage gas-directional control unit of the inventive system 2 allowing only a series connection of all the hydraulic gas compression/expansion modules over the gas circuit.

A variation of the gas-directional control unit is provided in FIG. 11 where each module comprises three 3-way 2-position directional valves that allow the compression/expansion unit to be operated in a variable configuration of stages like for system 1. A more simple variation of the gas-directional control unit is provided in FIG. 13 which allows all the modules of the compression/expansion unit to be operated only in series. Another simple variation of the gas-directional control unit is presented in FIG. 12 which allows all the modules of the compression/expansion unit to be operated only in series and only in the compression mode as the check valves will allow only 1-way flow of the gas.

Comparison of the Two Inventive Systems

One main difference between the two systems is that the hydraulic circuits of System 2 are open and connected to a common low pressure reservoir B.6 which supplies the active liquid. In this system, the hydraulic power conversion immediately precedes or follows the compression/expansion process as the hydraulic motor/pump is directly connected to the compression/expansion unit; thus the active liquid is at low pressure across the motor/pump and the heat exchange with the surrounding can be achieved with a classical low pressure air/liquid radiator. In System 1, the heat exchange with the surrounding immediately precedes or follows the compression/expansion process; therefore the exchangers' paths for the active liquid must be able to handle high pressure.

Another important difference is that, in system 1 the compression/expansion process lasts half a turn of the hydraulic motor/pump, as a consequence the displacement of a stage of the hydraulic motor pump must be equal to the useful volume of the compression/expansion module, which causes an important functional and construction limitation. In system 2 however, the useful volume of a compression/expansion module is the time integral of the displacement of the stage of the hydraulics, which provides a supplementary degree of freedom in design the system and allows running the motor pump at much higher speed, compatible with that of other systems.

Principle of Operation

The second inventive system operates in a similar way to the first system, the main difference being the path of the active liquid. Any liquid flowing into a compression/expansion module comes from the liquid tank B.6 and is pumped in the corresponding stage of the motor/pump. Any liquid flowing out of a compression/expansion module goes towards the heat exchanger B.5 through the corresponding piping and is pumped by the corresponding stage of the motor/pump and liquid directional module.

The operating sequences in motor mode as well as in compressor mode are the same as for system 1.

Main Fields of Application

This invention is mainly intended to the production of high pressure gas, particularly air, and use of its potential energy, for the purpose of power transmission and energy storage. One potential application of this invention would be the production of compressed air for industrial applications or for medical and breathing purpose like diving, and fire-fighting. Another potential application would be Pneumatic Energy Storage (or Fuel-free Compressed Air Energy Storage) for renewable energy sources support. In association with an electrical machine and power electronic converters it can be use to circumvent the intermittency of some renewable energy sources such as solar or wind sources.

Finally, the proposed engine can be used like any classical compressor to condition any gas under high pressure, but with high efficiency. Depending on the application, a gas treatment (or purifying) device would be necessary.

References

[1] Sylvain Lemofouet; *Investigation and Optimisation of Hybrid Electricity Storage Systems Based on Compressed Air and Supercapacitors*; PhD Thesis number 3628 available on: http://library.epfl.ch/theses/?nr=3628

[2] I. Cyphelly, A, Rufer, P. Brückmann, W. Menhardt, A. Reller; Usage of Compressed Air Storage System" DIS project 240050, Swiss Federal Office of Energy, May 2004 www.electricity-research.ch/

[3] I. Cyphelly; Pneumo-Hydraulic Converter for Energy Storage; U.S. Pat. No. 6,145,311, November 2000.

[4] Rufer and Al; Hydro-Pneumatic Storage System; PCT/IB 2007/051736.

The invention claimed is:

1. A multistage hydraulic system for converting the potential energy of a pressurized gas, particularly air, into mechanical work when rotating a shaft in one direction, and for producing compressed gas from the mechanical work of the rotating shaft, when rotating the said shaft in the reverse direction or in the same direction, by performing successive quasi-isothermal expansion/compression of the gas, wherein the said system comprises:

A multistage hydraulic gas Compression/Expansion Unit made of several Compression/Expansion Modules each having compression/expansion chambers of different volumes, each Module integrating an internal gas/liquid separating heat exchanger and being arranged to convert pressure power into hydraulic power of an active liquid, and vice-versa, by quasi-isothermal compression/expansion of the gas;

An external Heat Exchanger located outside the Compression/Expansion Unit for externally circulating active liquid that has been heated/cooled in the Compression/Expansion Unit by gas compression/expansion, and arranged to bring the externally circulating active liquid to a substantially constant temperature by heat transfer with ambient air; and A reversible, multi-circuit multi-displacement Hydraulic Motor/Pump having a common driving/driven rotatable shaft, said Hydraulic Motor/Pump being arranged to convert hydraulic power into mechanical power of said rotatable shaft, and vice-versa, the Hydraulic Motor/Pump having several circuits in correspondence with the Compression/Expansion Modules of the Compression/Expansion Unit, each said circuit being of different displacement and being connected to a Compression/Expansion Module of corresponding displacement or volume.

2. A system in accordance with claim 1 wherein each Compression/Expansion Module is an enclosure that provides, at a top part, a Liquid Distribution Chamber accessible through two valve-controlled liquid-ports, and at a bottom part, a Compression-Expansion Chamber accessible through two valve-controlled gas-ports, each of said ports being operable as intake port or as exhaust port depending on the operation mode of the system as compressor or as motor.

3. A system in accordance with claim 2 wherein the said gas and liquid ports of all the modules of said multistage Compression/Expansion Unit have valves that are operable mechanically by a common camshaft.

4. A system in accordance with claim 2 wherein each said Compression-Expansion Chamber integrates an internal Heat Exchanger designed to achieve a fast and efficient heat transfer between the gas and the active liquid during the compression/expansion process; each internal heat exchanger comprising a head Liquid Distribution Plate where a multitude of uniformly distributed thin tubes or hollow channels are fixed at their top end, and held together at their bottom end by a thin Porous Holding Plate that allows the flow of fluids between the tubes or hollow channels.

5. A system in accordance with claim 4 wherein said Liquid Distribution Plate of the internal Heat Exchanger separates the compression-expansion chamber from a liquid distribution chamber, and provides a central isolating channel receiving gas manifolds which extend the gas-ports into the compression-expansion chamber through the liquid distribution chamber.

6. A system in accordance with claim 4 wherein the internal Heat Exchanger is equipped with a thin mobile plate that separates the active fluids, gas and liquid, to avoid diffusion of the gas into the liquid, while allowing the compression/expansion and heat exchange processes to take place, the said mobile plate being movably mounted on the heat exchange tubes or channels and being drivable upwards and downwards along the heat exchange tubes or channels by the fluids.

7. A system in accordance with claim 1 comprising an external Multistage Multi-circuit Heat Exchanger that is either a direct radiator operable by High Pressure Liquid/Forced Ambient Air or an indirect radiator operable by High Pressure Liquid/Low Pressure Liquid and Low Pressure Liquid/Forced Ambient Air, associated with a fan driven by the common shaft of the Hydraulic Motor/Pump for generating the forced ambient air.

8. A system in accordance with claim 1 wherein each stage of the external Multistage Multi-circuit Heat Exchanger comprises two liquid paths connected at their top ends to the liquid ports of the Compression-Expansion Unit and at their bottom ends to two valve-free ports of the hydraulic motor-pump, the two liquid paths being arranged with liquid valves to allow the active liquid to flow in a closed circuit.

9. A system in accordance with claim 1 wherein each stage of the Hydraulic Motor/Pump has a piston movable in a cylinder with a given displacement, and the inter-stage volume ratio and displacement ratios between successive stages of the system are identical and equal to the inter-stage compression ratio in order to synchronize operation of the modules and to produce balanced forces on all pistons of the hydraulic motor-pump.

10. A system in accordance with claim 1 wherein each stage of the multi-stage Hydraulic Motor/Pump has a different displacement, and the inter-stage displacement ratios between successive stages are equal to the corresponding inter-stage volume ratios of the multi-stage compression/expansion unit in order to synchronize operation of the modules.

11. A system in accordance with claim 1 comprising a gas circuit equipped with a Multistage Gas Directional Control Unit made of several gas directional control valves arranged to operate the multistage Compression/Expansion Unit with the Compression/Expansion Modules all in series, all in parallel, or some in parallel and some in series, over the gas circuit.

12. A system in accordance with claim 1 wherein the Compression-Expansion Modules of the Compression/Expansion Unit are connected through a Multistage Gas Directional Control Unit; each circuit of the Hydraulic Motor/Pump is connected through a Multi-circuit Liquid Directional Control Unit to a Compression/Expansion Module of corresponding displacement or volume; and comprising a single external low pressure forced-air Heat Exchanger associated with a liquid reservoir.

13. A system in accordance with claim 1 comprising a hydraulic circuit equipped with a Multi-circuit Liquid Directional Control Unit made of several hydraulic directional control modules, each module being arranged to operate a circuit of the multi-circuit hydraulic motor/pump in motor or in pump mode, by connecting the intake and exhaust ports of the said circuit either to the corresponding compression/expansion module, or to the heat exchanger or to a liquid reservoir.

14. A method for converting the potential energy of pressurized gas, particularly air, into mechanical work of a rotating shaft by performing a sequence of transformations comprising the steps of:

Expanding the pressurized gas in a dedicated multistage hydraulic gas expansion unit by transferring the said gas from a chamber of one stage of the unit into a bigger chamber of the next stage initially full of a liquid, in such a way to drive out the said liquid, while both the liquid being driven out of the bigger chamber and the liquid being pumped into the smaller chamber heat the expanding gas by means of an internal fluid-separating gas/ liquid heat exchanger integrated in each chamber, so as to perform an essentially isothermal expansion;

Heating the liquid flowing out of and into the said chambers and which has been cooled by the expanding gas, by means of an external heat exchanger, in order to maintain the said liquid at ambient temperature; and Further converting hydraulic power produced by pressurized liquid flowing out of the said bigger chamber of the expansion unit into mechanical power by means of a circuit of a multi-circuit multi-displacement hydraulic motor/pump, while another circuit of smaller displacement of the said motor/pump uses part of the produced power to pump the liquid into the said smaller chamber.

15. A method in accordance with claim 14 wherein the said sequence of transformations involves two stages of a multistage hydraulic gas expansion/compression unit, two circuits of a multi-circuit multi-displacement hydraulic motor/pump and the said external heat exchanger is repeated several times, to perform a multistage expansion/compression process with equal expansion/compression ratio among stages.

16. A method for compressing a gas, particularly air, from the mechanical work of a rotating shaft by performing a sequence of transformations, comprising the steps of:

Converting the mechanical power of the rotating shaft into hydraulic power by driving a liquid by means of a circuit of a multi-circuit multi-displacement hydraulic motor/pump, Compressing low pressure gas contained in a chamber of one stage of a multistage hydraulic gas compression unit, by forcing the said gas into a smaller chamber of the next stage initially full of liquid, by injecting the liquid driven by one stage of a circuit of the multi-circuit multi-displacement hydraulic motor/pump, while emptying the said smaller chamber through another stage of smaller displacement of the said motor/pump, in such a way that the liquid being driven out of the smaller chamber and the liquid being pumped into the bigger chamber cool the compressing gas by means of an internal fluid-separating gas/liquid heat exchanger integrated in each chamber, so as to perform an essentially isothermal compression; and Further cooling down the liquid flowing out of and into the said chambers and which has been heated by the compressing gas, by means of an external heat exchanger, in order to maintain the said liquid at ambient temperature.

17. A method in accordance with claim 16 wherein the said sequence of transformations involves two stages of a multistage hydraulic gas expansion/compression unit, two circuits of a multi-circuit multi-displacement hydraulic motor/pump and the said external heat exchanger is repeated several times, to perform a multistage expansion/compression process with equal expansion/compression ratio among stages.

* * * * *